(12) United States Patent
Marchetta et al.

(10) Patent No.: US 10,759,487 B2
(45) Date of Patent: Sep. 1, 2020

(54) STEERING GROUP OF A MOTOR VEHICLE AND MOTOR VEHICLE THEREOF

(71) Applicant: PIAGGIO & C S.P.A., Pontedera, Pisa (IT)

(72) Inventors: Francesco Marchetta, Pisa (IT); Luca Balduino, Pisa (IT); Daniele Torriani, Pisa (IT)

(73) Assignee: PIAGGIO & C S.P.A., Pontedera, Pisa (IT)

( * ) Notice: Subject to any disclaimer, the term of this patent is extended or adjusted under 35 U.S.C. 154(b) by 326 days.

(21) Appl. No.: 15/566,414

(22) PCT Filed: Apr. 8, 2016

(86) PCT No.: PCT/IB2016/052012
§ 371 (c)(1),
(2) Date: Oct. 13, 2017

(87) PCT Pub. No.: WO2016/166643
PCT Pub. Date: Oct. 20, 2016

(65) Prior Publication Data
US 2018/0093736 A1 Apr. 5, 2018

(30) Foreign Application Priority Data

Apr. 14, 2015 (IT) .............................. PD2015A0078

(51) Int. Cl.
*B62K 21/00* (2006.01)
*B62K 21/10* (2006.01)
(52) U.S. Cl.
CPC .............. *B62K 21/10* (2013.01); *B62K 21/00* (2013.01)

(58) Field of Classification Search
CPC ........ B62K 21/00; B62K 21/02; B62K 21/04; B62K 21/08; B62K 21/10; F16F 1/32; F16F 2228/063; F16F 2228/12
See application file for complete search history.

(56) References Cited

U.S. PATENT DOCUMENTS

| | | | | |
|---|---|---|---|---|
| 691,597 | A | * | 1/1902 | Christiansen .......... B62K 21/10 280/271 |
| 2,087,535 | A | * | 7/1937 | Dall ....................... B62K 21/10 280/272 |

(Continued)

FOREIGN PATENT DOCUMENTS

EP 1783023 A1 5/2007

OTHER PUBLICATIONS

Search Report for PCT/IB2016/052012 dated Jun. 10, 2016.

*Primary Examiner* — Jacob D Knutson
*Assistant Examiner* — Maurice L Williams
(74) *Attorney, Agent, or Firm* — Arent Fox LLP; Michael Fainberg (57) ABSTRACT

Steering group of a motor vehicle comprising a front frame provided with a steering tube that rotatably houses a steering shaft or pin, which rotates about a steering axis, the front frame being provided with an upright integral with said steering tube, the front frame comprising a steering bracket, integral in rotation with the steering shaft. Advantageously, the steering group comprises elastic return means which elastically influence the steering shaft to position itself centrally with respect to the front frame, said elastic return means being placed and mechanically connected between the upright and the steering bracket in order to exert an elastic return action when the steering shaft rotates with respect to said central symmetrical position, wherein said elastic return means have a regressive trend elastic response.

17 Claims, 7 Drawing Sheets

(56) References Cited

U.S. PATENT DOCUMENTS

| | | | | |
|---|---|---|---|---|
| 3,938,609 A | | 2/1976 | Kensaku et al. | |
| 4,006,915 A | * | 2/1977 | Parker | B62K 21/10 280/271 |
| 4,108,460 A | * | 8/1978 | Silva, Jr. | B62K 3/005 280/236 |
| 4,558,878 A | * | 12/1985 | Motrenec | B62K 21/08 188/317 |
| 5,492,033 A | * | 2/1996 | Hopey | B62K 21/08 280/272 |
| 5,603,245 A | * | 2/1997 | Walczak | B21C 1/30 123/90.5 |
| 6,059,353 A | * | 5/2000 | Whitman | B60B 29/00 296/180.1 |
| 2003/0136216 A1 | * | 7/2003 | Chen | B62K 21/00 74/548 |
| 2005/0082785 A1 | * | 4/2005 | Mydlarz | B62K 21/02 280/276 |
| 2005/0236791 A1 | | 10/2005 | Carr | |
| 2006/0027400 A1 | * | 2/2006 | Garcia | E21B 41/0085 175/320 |
| 2006/0207845 A1 | * | 9/2006 | Gogo | B62K 21/08 188/290 |
| 2007/0182123 A1 | * | 8/2007 | Bryant | B62K 3/002 280/271 |
| 2007/0248440 A1 | * | 10/2007 | Andersen | B65G 69/003 414/401 |
| 2007/0278763 A1 | * | 12/2007 | Saville | B62K 5/05 280/269 |
| 2011/0175321 A1 | * | 7/2011 | Kuboyama | F16F 9/54 280/286 |
| 2011/0309598 A1 | * | 12/2011 | Mori | B62K 21/08 280/276 |
| 2012/0020770 A1 | * | 1/2012 | Rogers | F01D 5/26 415/119 |
| 2012/0085305 A1 | * | 4/2012 | Cleeves | F01L 1/30 123/90.26 |
| 2012/0181770 A1 | | 7/2012 | Kraiss | |
| 2012/0211600 A1 | * | 8/2012 | Mellor | B64C 25/00 244/100 R |
| 2013/0234410 A1 | * | 9/2013 | Sumihara | B62D 3/12 280/93.514 |
| 2014/0265203 A1 | * | 9/2014 | Zuleger | B60G 13/06 280/124.16 |
| 2014/0284899 A1 | * | 9/2014 | Takenaka | B62K 21/00 280/279 |
| 2015/0021131 A1 | * | 1/2015 | Wootten | F16F 9/348 188/280 |
| 2015/0119192 A1 | * | 4/2015 | Otanez | B60W 10/02 477/5 |
| 2015/0251722 A1 | * | 9/2015 | Watanabe | B62K 21/08 280/272 |

\* cited by examiner

STEERING GROUP OF A MOTOR VEHICLE AND MOTOR VEHICLE THEREOF

CROSS-REFERENCE TO RELATED APPLICATIONS

This application is the U.S. National Stage Application of International Patent Application No. PCT/IB2016/052012, filed on Apr. 8, 2016, which claims priority to Italian Patent Application No. PD2015A000078, filed on Apr. 14, 2015, the contents of each of which is incorporated herein by reference in its entirety.

FIELD OF APPLICATION

This invention relates to a steering group of a motor vehicle and the related motor vehicle comprising said steering assembly.

STATE OF THE ART

As is known, the front axle of a motor comprises a steering group connected to the front steering wheel of the motor vehicle.

During use, especially at low speeds, the steering of a motor vehicle may tend to lock, i.e., to impose a steering angle greater than that set by the user through the handlebar.

The causes of this dynamic behaviour of the front axle are essentially related to the fact that the front wheel rotates about a steering axis that has a certain angle of inclination relative to the vertical to the ground. This angle of inclination, combined with the fact that the steering axis does not pass through the pin of the front wheel, but is usually set back with respect to the wheel pin, in the opposite direction to the direction of travel, confers to the front wheel the so-called "trail". Trail means the distance between the projection on the ground of the perpendicular passing through the centre of rotation of the wheel and the steering axis of the wheel. The steering axis is usually the rotation axis of a fork, arranged astride the wheel, which supports the latter on opposite sides. Obviously, the same considerations apply to single-arm fork solutions in which the wheel is rotatably supported cantilevered with respect to a single arm.

The greater the trail, the more marked is the phenomenon. Furthermore, for the same steering geometry, increasing the diameter of the rim, and therefore the overall diameter of the wheel, also increases the trail.

In addition, any vertical loads imposed on the front wheel, for example in the case of front fairings and optical units fixed on the steering group, and rotatable with it, contribute further to increasing the locking effect of the steering.

PRESENTATION OF THE INVENTION

To solve the above problems, i.e., to counteract this locking effect of the steering, to date various solutions have been adopted in the known art.

For example, as regards the effect of the vertical weight bearing on the front wheel, it is known to centre the weight of the fairing precisely on the steering axis: However, this technique creates considerable aesthetic constraints on the geometry, type and positioning of the fairing itself and the related headlight.

Moreover, it is also known to use suitable steering plates that increase the offset between the fork and the steering axis, which is particularly set back, so as to reduce the trail at the same angle of incidence, i.e., the inclination of the steering axis. However, even this solution imposes constraints in terms of aesthetics as well as the dynamics of the vehicle.

It is also possible to act on the inclination of the steering axis (incidence) by reducing it or even reducing the diameter of the front wheel: obviously, both solutions have new non-trivial effects on both the aesthetics and dynamics of the vehicle.

Then, it is known in the art to use lever mechanisms that oppose the steering movement; these mechanisms are bound to the lower steering plate and to the frame so as to load springs during steering; such springs, thanks to a related arm, exert a moment that opposes the steering. In this way, without changing the dynamic and/or aesthetic parameters of the vehicle, one tries to cancel the locking effect of the steering described above.

The known solutions that provide for such springs and lever systems present new drawbacks.

In fact, it is not easy to calibrate the springs so that the action contrasting the locking effect of the steering is effective and is not annoying for the user.

In fact, if "soft" springs are used, the system is not particularly noticeable or annoying for the user but, on the other hand, it is only effective for substantial steering angles, since the force exerted by the spring, and therefore the moment on the steering axis, is only sufficient for long strokes of the spring itself. In fact, increasing the steering angle not only increases the force exerted by the spring, which deforms more, but also increases the arm exerted by the spring around the steering axis and thus the moment that counteracts the locking of the steering itself. So, once a threshold value is exceeded, the action of the spring begins to be effective to counteract the locking of the steering while at low steering angles the action of mechanism is substantially unnoticeable.

If, on the contrary, "stiff" springs are used, the system is very effective from the lowest steering angles but, on the other hand, for high steering angles the system is too noticeable by the driver and, at the limit, annoying as it makes steering excessively hard. In fact, as seen, increasing the steering angle not only increases the force exerted by the spring, which deforms more, but also increases the arm exerted by the spring around the steering axis and thus the moment that counteracts the locking of the steering itself. So, when a threshold value is exceeded, the action of the mechanism is such as to excessively oppose the steering action desired by the user, who feels that the steering in heavy and unwieldy. With the current solutions of the known art, the choice of the stiffness of the spring is a compromise that is never able to fully meet the requirements of users.

Therefore, there is a need to solve the drawbacks and limitations mentioned in reference to the prior art.

This need is met by a steering group of a motor vehicle according to claim 1.

DESCRIPTION OF THE DRAWINGS

Further characteristics and advantages of this invention will be more understandable from the following description of its preferred and non-limiting examples of embodiments, in which.

The elements, or parts of elements, in common between the embodiments described below will be indicated with the same reference numbers.

DETAILED DESCRIPTION

With reference to the above figures, reference number 4 globally indicates an overall schematic view of a steering group of a motor vehicle 8.

For the purposes of this invention, it should be clarified that the term motor vehicle must be considered in broad sense, encompassing any motorcycle having at least two wheels, namely a front wheel 10 and a rear wheel. Therefore, this definition also includes motorcycles having three wheels, of which for example the motor vehicles that comprise a single steering wheel on the front axle and two drive wheels on the rear axle, and also motor vehicles having two front steering wheels, possibly tilting, and one rear drive wheel. This definition also includes quadricycles having two front steering wheels, possibly tilting, and two rear wheels, regardless of traction.

This invention focuses on a front axle 12 of a motor vehicle 8; the rear axle is not described or illustrated. For the purposes of this invention, the rear axle can be of any type. In general both the rear fork of the motor vehicle and the frame can have any shape and size, and may be for example of the lattice or box type, die-cast and so on.

In particular, the steering group 4 of a motor vehicle comprises a front frame 16 fitted with a steering tube 20 rotatably housing a steering shaft or pin 24, which rotates around a steering axis X-X.

The steering tube 20 typically has a cylindrical shape and rotatably supports the steering shaft 24, in turn connected to a handlebar 28 to allow the user to steer. In turn, in a known manner, the steering shaft 24 is kinematically connected with the front wheel 10 or front wheels 10, so as to transmit to the wheel or front wheels the steering movement imposed by the user via the handlebar 28.

The front frame 16 is fitted with an upright 32 integral with said steering tube 20.

The upright 32 may be any mechanical elements of the frame, including the steering tube 20.

The steering tube 20 defines the inclination or incidence of the steering axis X-X, i.e., the angle that the steering axis forms with a vertical direction Z-Z, perpendicular to the ground, on a centreline plane M-M of the front frame 16 direct along a longitudinal direction of travel Y-Y.

Figure 1:
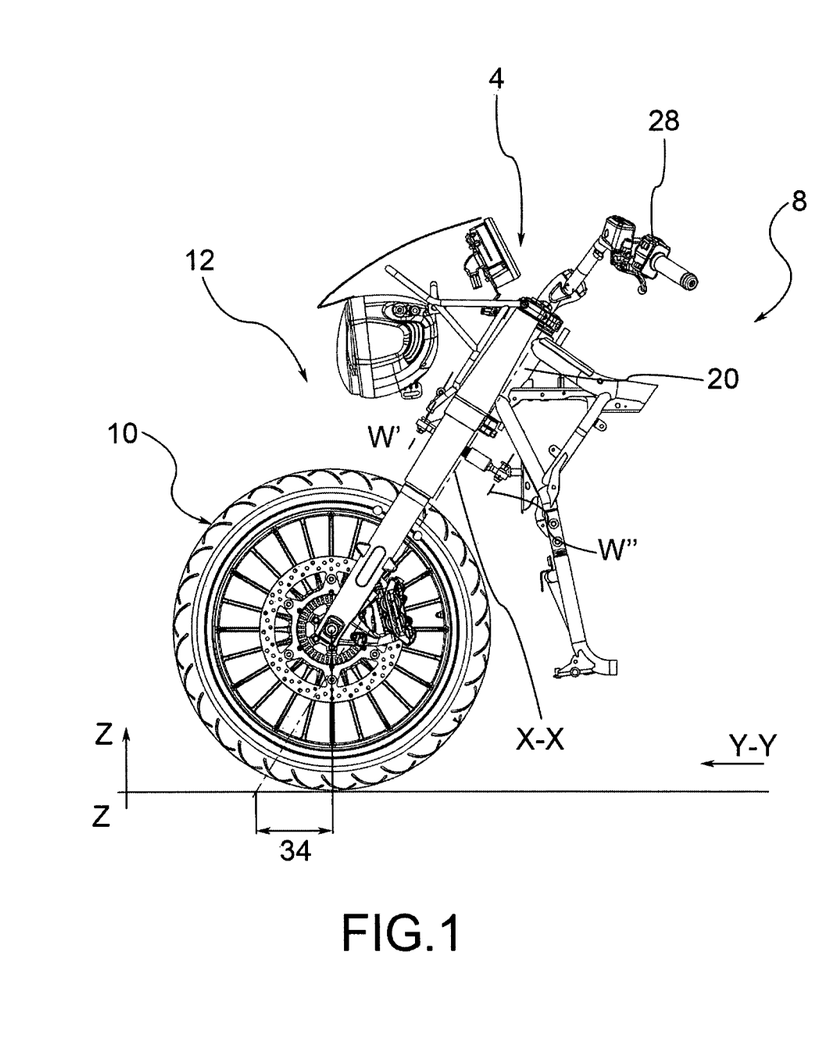
FIG. 1 is a side view of a motor vehicle front axle according to an embodiment of this invention.
Figure 2:
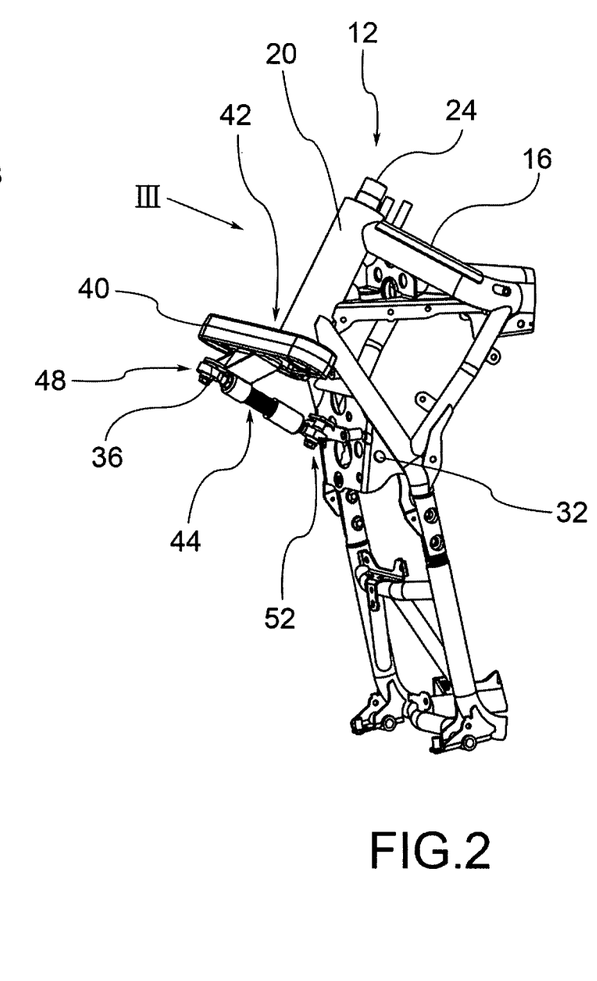
FIG. 2 is a partial perspective view of the motor vehicle front axle of FIG. 1.
Figure 3:
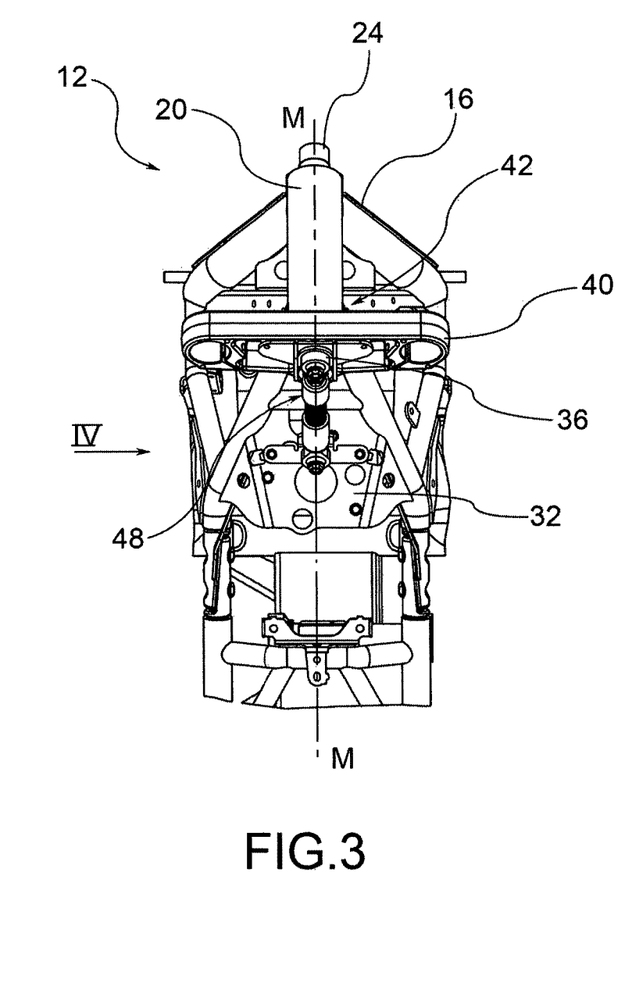
FIG. 3 is a front view of the front axle of FIG. 2, from the side of the arrow III of FIG. 2.
Figure 4:
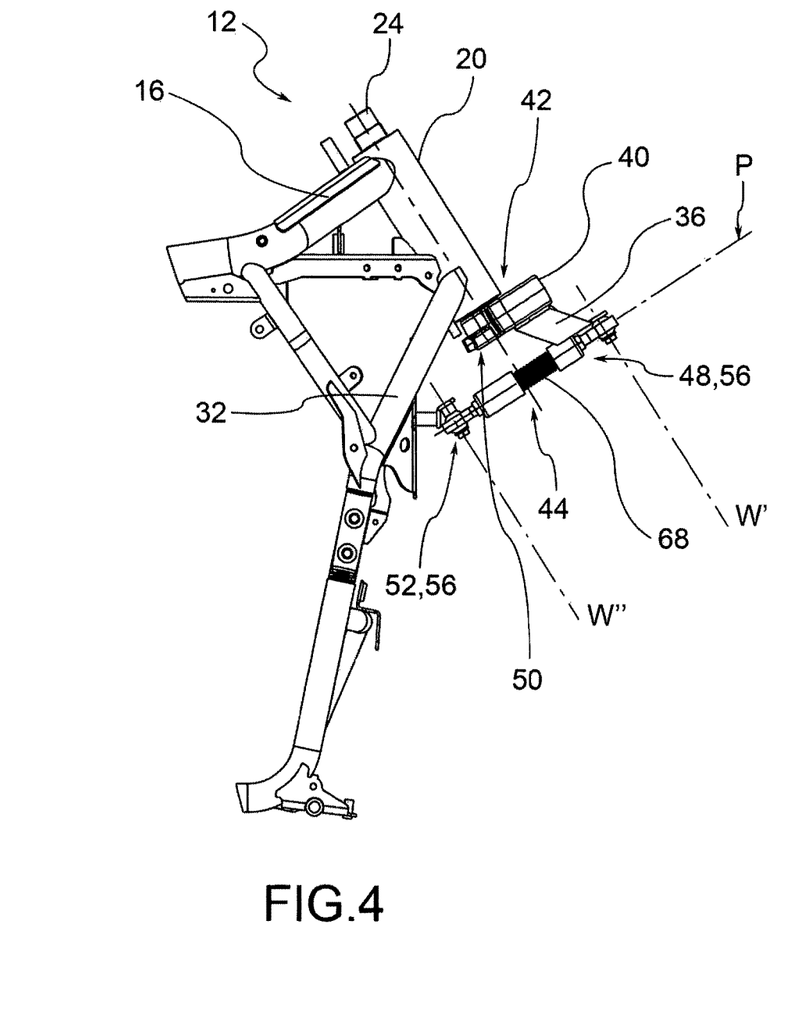
FIG. 4 is a side view of the front axle of FIG. 2, from the side of the arrow IV of FIG. 3.

In FIG. 1 it is also possible to see the trail 34, i.e., the distance between the projection on the ground of the perpendicular passing through the centre of rotation of the wheel and the steering axis X-X of the front wheel 10.

The front frame 16 also comprises a steering bracket 36, integral in rotation with the steering shaft 24. Steering bracket 36 means any mechanical element integral in rotation with the steering shaft 24. The steering bracket can have any shape and size and be made with any material.

For example, the steering bracket 36 can be arranged in correspondence of a lower steering plate 40 associated to a lower end 42 of the steering tube 20, on the side opposite the handlebar 28.

Advantageously, the steering group 4 comprises elastic return means 44 that elastically influence the steering shaft 24 to position itself in a central position symmetrical with respect to the front frame 16.

The elastic return means 44 are placed and mechanically connected between the upright 32 and the steering bracket 36 in order to exert an elastic return action when the steering shaft 24 rotates with respect to said central symmetrical position.

In other words, the elastic return means 44 elastically influence the steering shaft 24 to return to the central symmetrical position whenever the latter is rotated by the user, by means of the handlebar 28, with respect to this central symmetrical position.

Advantageously, said elastic return means 44 have a regressive trend elastic response, wherein the stiffness of the elastic return means 44 decreases as the displacement of the steering shaft 24 from said central position increases.

Preferably, said elastic return means 44 have a zero preload, so as not to exert any elastic action around the central symmetrical position of the steering shaft 24.

According to a possible embodiment, the elastic return means 44 are placed between the upright 32 and the steering bracket 36 so as to be pulled when the steering shaft 24 rotates with respect to said central symmetrical position. In this embodiment, the elastic return means 44 have a regressive trend elastic response, wherein the stiffness of the elastic return means 44 decreases as the traction of said return means 44 increases.

According to a further embodiment, the elastic return means 44 are placed between the upright 32 and the steering bracket 36 so as to be compressed when the steering shaft 24 rotates with respect to said central symmetrical position. In this embodiment, said elastic return means 44 have a regressive trend elastic response, wherein the stiffness of the elastic return means 44 decreases as the compression of said return means 44 increases.

Thanks to this invention, as the steering angle increases, the steering shaft 24 obtains an elastic reaction force that increases less and less, i.e., in a regressive manner; said elastic reaction force translates into a reaction torque on the steering shaft 24 that counteracts the steering itself. In other words, the stiffness of the elastic return means 44, and therefore the increase of the reaction torque on the steering shaft 24, decreases with the increase of the steering angle.

In this way, the regressiveness of the elastic return means 44 causes said elastic return means to oppose the tendency of the steering to lock, improving the running dynamics and the sensation of stability of the vehicle. Moreover, such regressiveness of the elastic return means 44 means that the steering never becomes too stiff in the case of large steering angles, such as for example in manoeuvres standing still or at low speed.

Preferably, a first attachment point 48 of the elastic return means 44 to the steering bracket 36 is positioned in front of the steering axis X-X, in a forward direction of travel with respect to a plane P orthogonal to the steering axis X-X and parallel to a lower surface of said steering bracket 36, and wherein a second attachment point 52 of the elastic return means 44 to the upright 32 is positioned behind the steering axis X-X with respect to said forward direction of travel on the plane P.

In this way the elastic return means 44 are subjected to an action of compression when the steering shaft 24 is rotated with respect to the central symmetrical position. The attachment points 48, 52 are preferably, but not necessarily, aligned with respect to the centreline plane M-M of the front frame 16, placed parallel to a straight direction of travel, so as to have a symmetrical behaviour of the elastic return means 44 in the steering to the left and to the right with respect to the symmetrical central position of the steering shaft 24.

According to an embodiment, said attachment points 48, 52 of the elastic return means 44 comprise cylindrical joints 56 which allow respective rotations of the elastic return means 44 around the rotation axes W' and W" parallel to said steering axis X-X.

Figure 5:
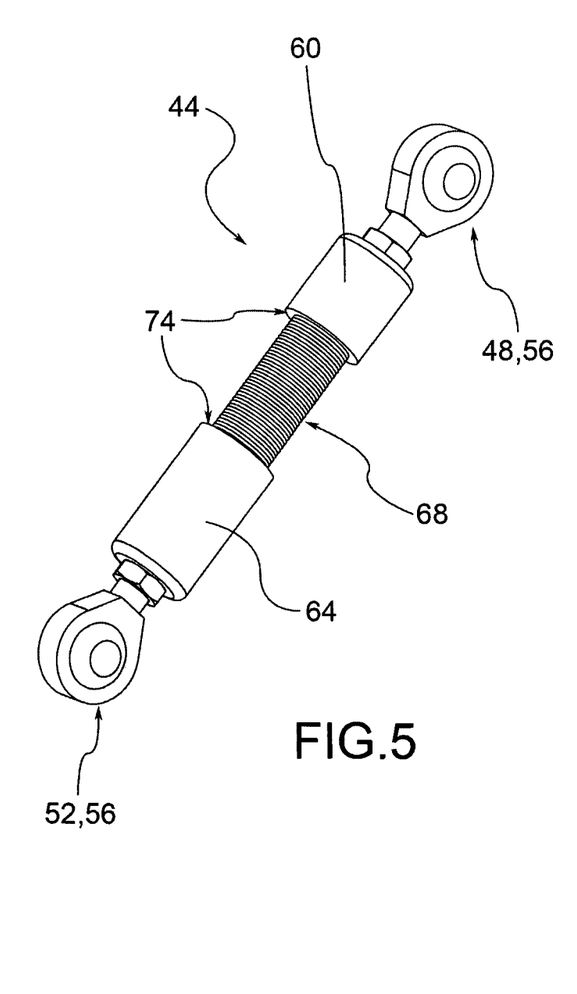
FIG. 5 is a perspective view of elastic return means of a front axle according to an embodiment of this invention.
Figure 6:
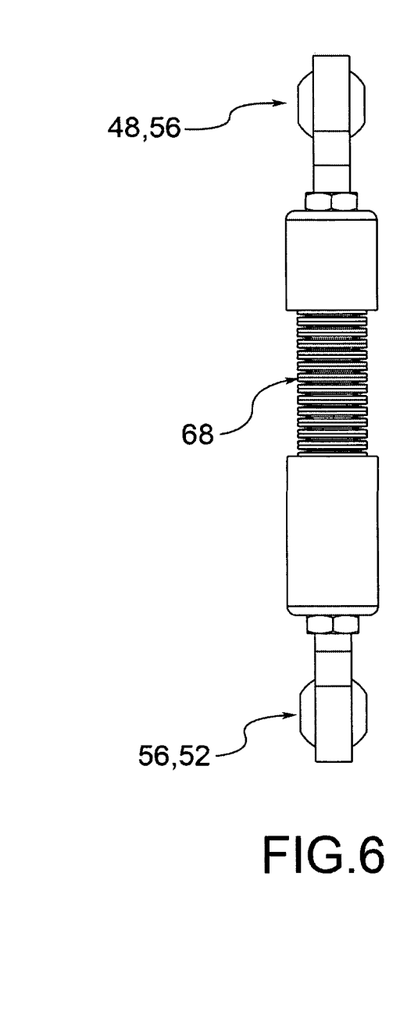
FIGS. 6 to 7 represent respectively a side view and a partially sectional view of the elastic return means of FIG. 5.
Figure 7:
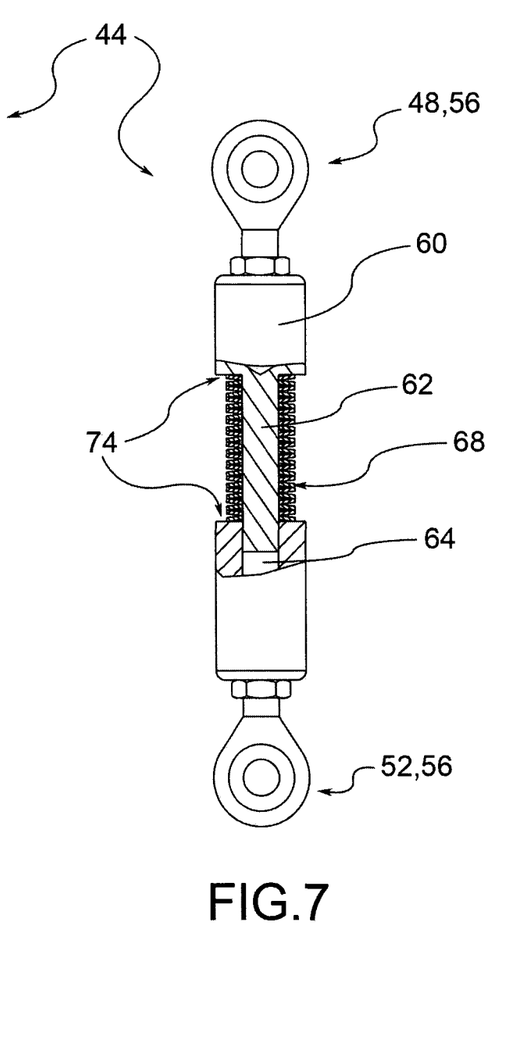

According to an embodiment, the elastic return means 44 comprise a piston 60 provided with a stem 62 slidable with respect to a seat 64, the piston 60 and the seat 64 being each integral with one of said attachment points 48, 52; between the piston 60 and the seat 64 is interposed at least one spring 68, so that the interaxial spacing 72 or distance between the attachment points is variable in function of the compression of said spring 68.

In particular, the spring 68 is interposed between the piston 60 and the seat 64 so as to abut against respective stops 74.

For example, the spring 68 is arranged coaxially to the stem 62 of the piston 60.

Preferably, the elastic return means 44 comprise at least one spring 68 regressive as a function of the compression.

Figure 8:
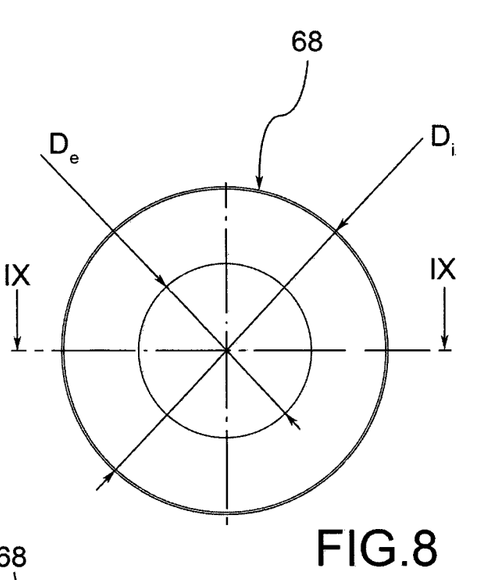
FIG. 8 is a plan view of a Belleville spring.
Figure 9A:
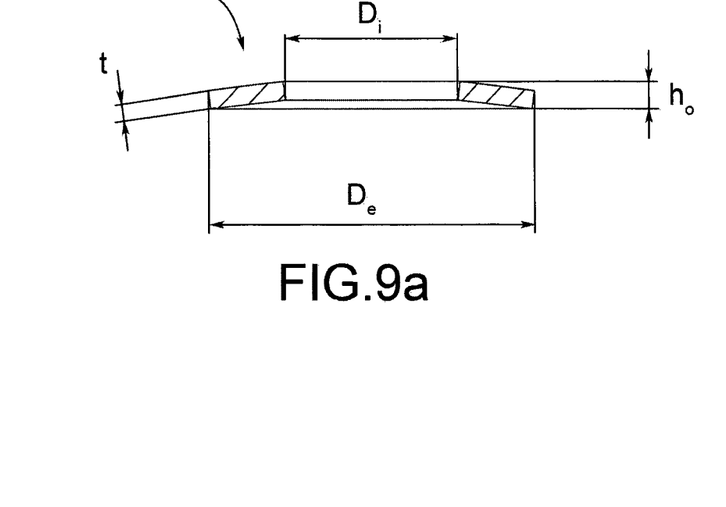
FIG. 9a is a sectional view of the Belleville spring of FIG. 8, along the section line IX-IX of FIG. 8.

According to an embodiment, said at least one spring 68 is a Belleville spring.

Preferably, the elastic return means 44 comprise a plurality of regressive trend Belleville springs, positioned in series.

Preferably, said Belleville springs 68 in series are placed in direct contact with each other.

For example, said Belleville springs 68 are provided for in a number between 10 and 40, in series with each other; preferably, said Belleville springs 68 are provided for in a number between 15 and 30, in series with each other. Preferably, the Belleville springs 68 are equal to each other.

As regards the arrangement of the Belleville springs in series, it is necessary to calculate the equivalent stiffness Keq and the stroke x required of the series of springs, so as to obtain the law that defines the elastic force provided by the series of springs.

Placing the Belleville springs in series, one obtains:

$$\frac{1}{k_{eq}} = \sum_{i=1}^{N} \frac{1}{k_i}$$

$$x = \sum_{i=1}^{N} x_i$$

$$F = k_{eq} * x$$

In particular, placing N equal Belleville springs in series, one has:

$$k_{eq} = \frac{1}{N * \frac{1}{k_i}}$$

$$x_i = \frac{x}{N}$$

Figure 10:
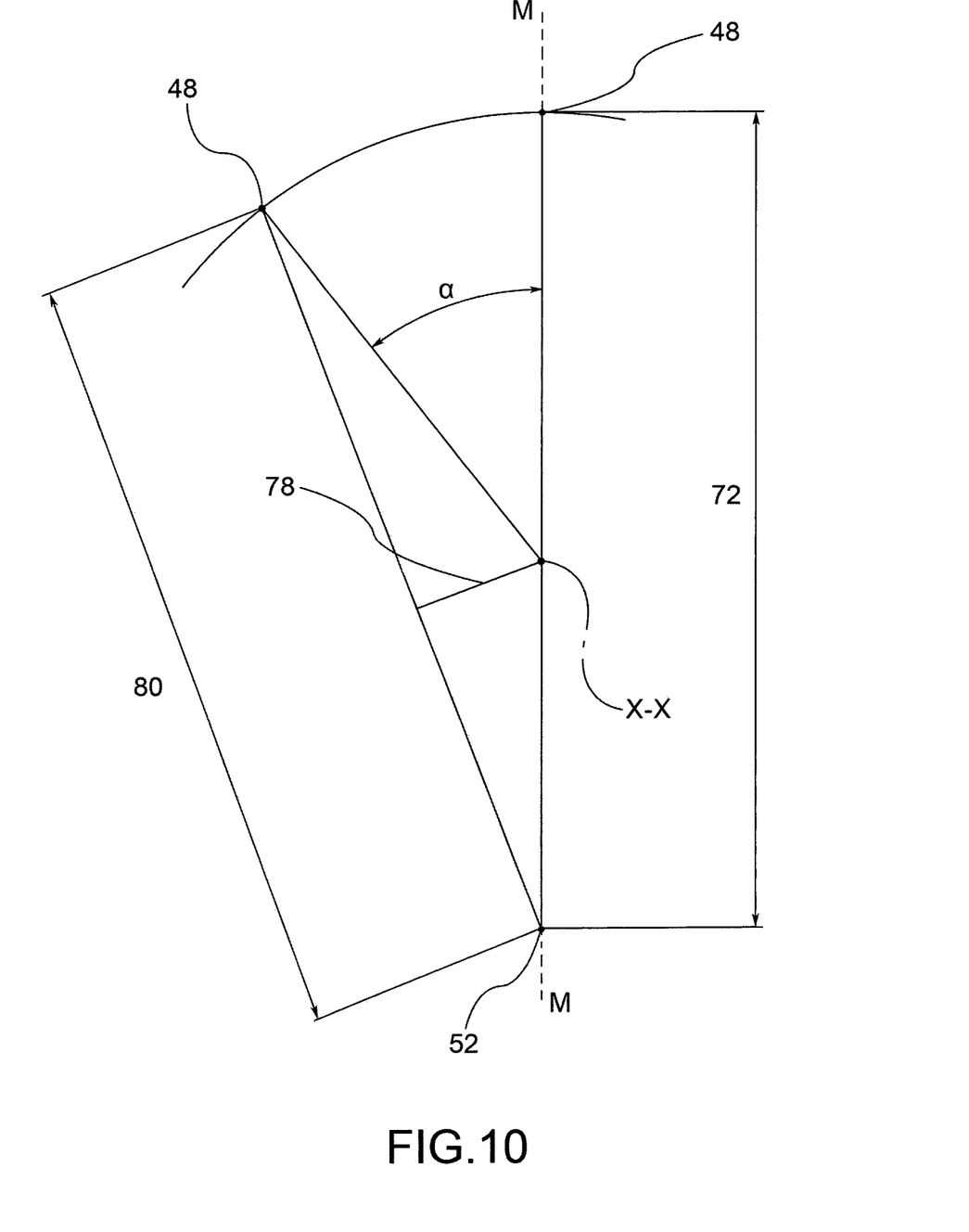
FIG. 10 is a schematic view of a steering mechanism provided with elastic return means according to this invention.

The single Belleville spring has a regressive behaviour: the stiffness decreases as the stroke of the single spring increases. Consequently, the equivalent stiffness will decrease with the increase of the total stroke of the system of springs in series. In particular, the total stroke is calculated with the following equation:

$$X = \text{initial interaxial spacing} - (\text{interaxial spacing})\propto$$

where $\propto$ is the ith steering angle (see diagram of FIG. 10).

Initial interaxial spacing therefore means the initial distance between the attachment points 48, 52 of the elastic return means 44 when the steering shaft 24 is located in the central symmetrical position; in other words the initial interaxial spacing is substantially equal to the length at rest of the elastic return means. While the (interaxial spacing)$\propto$ is the interaxial spacing, i.e., the distance between said attachment points 48, 52 of the elastic returns means 44 when the steering shaft 24 is rotated in the generic position $\propto$.

According to an embodiment, the Belleville springs (68) are sized so as to have $1.8 < D_e/D_i < 2.4$, where $D_e$ is equal to an outer diameter of the Belleville spring and $D_i$ is equal to an inner diameter of the Belleville spring 68.

According to an embodiment, the Belleville springs 68 are sized so as to have $18 < D_e/t < 28$, where $D_e$ is equal to an outer diameter of the Belleville spring and t is equal to a thickness of the Belleville spring 68.

According to an embodiment, the Belleville springs 68 are sized so as to have $0.4 < h_o/t < 0.75$, where $h_o$ is equal to the rest height of the Belleville spring and t is equal to a thickness of the Belleville spring 68.

The operation of a steering group for motorcycles according to this invention will now be described.

As seen the fundamental characteristic of the steering group of this invention is given by the presence of springs with regressive behaviour.

In particular, the elastic action transmitted to the steering shaft is a steering torque that depends not only on the force transmitted by the spring, on its function of the stroke between the attachment points 48, 52, but also on the arm 78 of such force with respect to the steering axis X-X.

Figure 12:
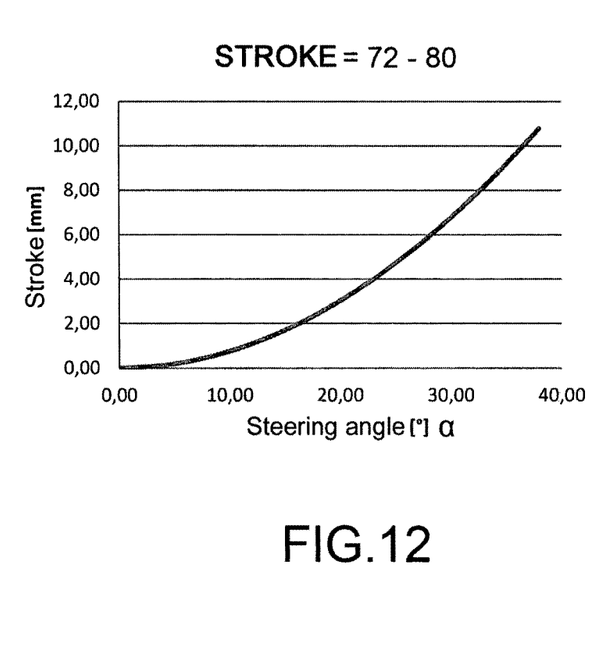
FIG. 12 consists of a graph depicting the trend of a stroke of the elastic return means as a function of a steering angle, according to an embodiment of this invention.

FIG. 12 shows the trend of the stroke between the attachment points 48, 52 (on the ordinate) as a function of the steering angle imposed by the user (on the abscissa).

Substantially the stroke between the attachment points 48, 52 is equal to the difference between the interaxial spacing 72 (initial, i.e., in the central symmetrical position of the steering shaft 24) and the final interaxial spacing 80, as a result of a steering angle α with respect to the central symmetrical position.

Figure 13:
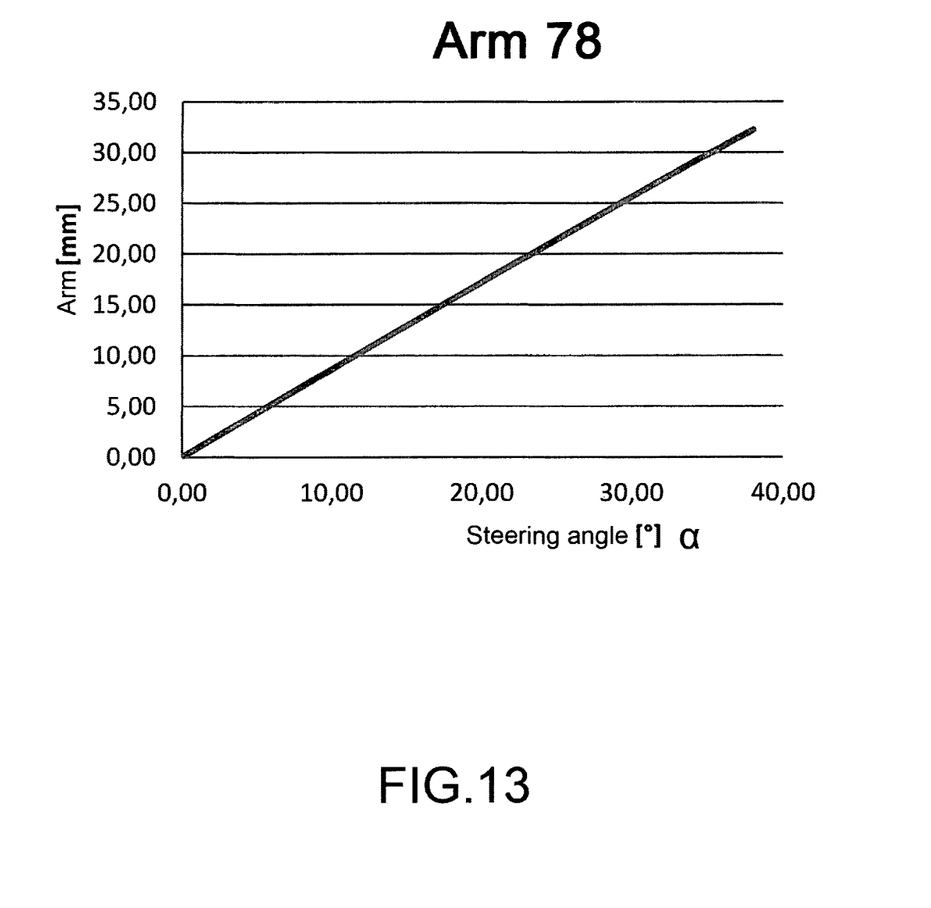
FIG. 13 consists of a graph depicting the trend of an arm of the force exerted by the elastic return means with respect to the steering axis as a function of the steering angle, according to an embodiment of this invention.

FIG. 13 shows the trend of the arm of the force expressed by the spring with respect to the steering axis X-X (on the ordinate) as a function of the steering angle imposed by the user (on the abscissa). A construction of this arm is clearly illustrated in FIG. 10, in which a geometric construction is shown, on a plane P orthogonal to the steering axis X-X, comprising the attachment points 48, 52, the steering axis X-X, the steering angle α, the arm 78, as well as the initial interaxial spacing 72 (i.e., with the steering in c), and the final interaxial spacing 80, i.e., the interaxial spacing or distance between said attachment points 48, 52 following the rotation of the steering axis X-X equal to a steering angle α.

Figure 9B:
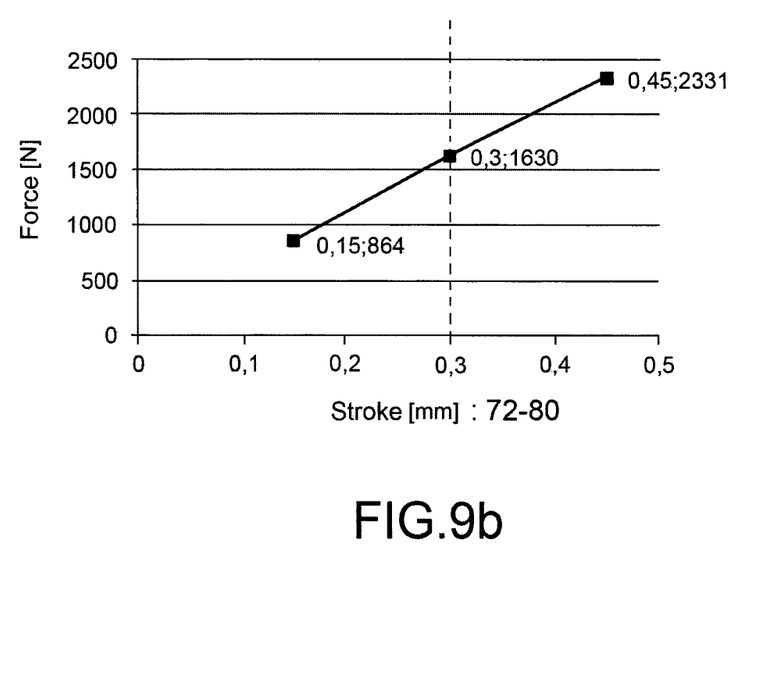
FIG. 9b is a force/displacement diagram, respectively in ordinates and in abscissae, of a regressive trend Belleville spring according to this invention.

A trend of the force expressed by the Belleville spring as a function of its compression is expressed, as seen, in FIG. 9b. From the composition of the cited trends, one obtains the graph of FIG. 11 relative to the elastic return torque provided by the elastic return means 44 to the steering shaft 24.

Figure 11:
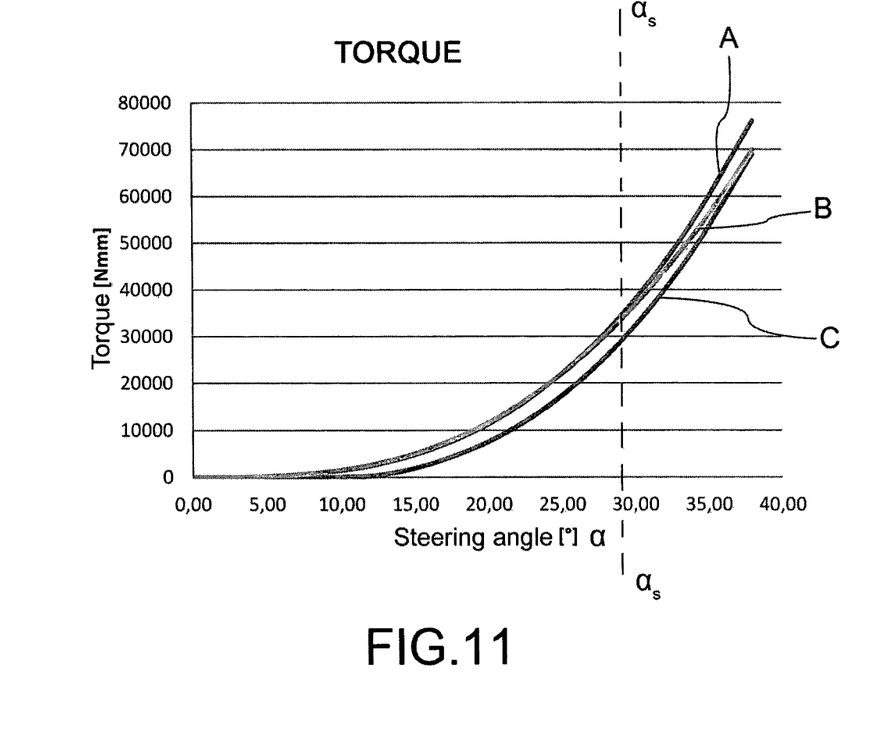
FIG. 11 consists of graphs depicting the trend of an elastic return torque as a function of a steering angle, exerted by elastic return means according to an embodiment of this invention.

As one can see, FIG. 11 shows three different curves A, B, C, related to distinct trends of elastic return torque on the steering shaft, obtainable with different return springs, as a function of different steering angles (on the abscissa).

In particular, curve A represents the elastic return torque obtainable with the use of a first linear spring having a first stiffness K1, and curve C represents the elastic return torque obtainable with the use of a second spring linear having a second stiffness K2, with K1>K2.

Well, curve B represents an example of an elastic return torque according to this invention, which is able to mediate the behaviour obtainable by the use of a linear spring of stiffness greater than K1, in a section lower than a threshold angle $\alpha_s$, and with the use of a linear spring of stiffness less than K2, after having exceeded said threshold angle $\alpha_s$.

From graph B, one can see that the trend of the torque as a function of the steering angle is initially progressive, that is, the slope of the torque/steering angle curve increases with the increase of the steering angle. Then, after reaching said threshold value $\alpha_s$, the slope of the torque/steering angle curve increases less with respect to the lower steering angles, thus becoming "less" progressive.

As can be appreciated from the description, the steering group according to the invention allows overcoming the drawbacks presented in the prior art.

In particular, the use of one or more regressive springs allows having an efficient mechanism from the lowest steering angles without excessively hardening the steering even at higher steering angles.

In other words, the mechanism is always effective and never invasive or perceived as such by the user.

Moreover, the mechanism allows countering the phenomenon of steering lock also by employing front axles with high trail, for example due to a large diameter wheel, for example of 21 inches, and angles of incidence even greater than 40 degrees.

Moreover, this invention does not require the use of steering plates to reduce the trail or to centre the weight of the fairing on the steering axis. In this way, the designers do not have particular aesthetic or design constraints for the manufacture of motor vehicles even having "critical" trail values.

The same applies to the size and the weight of the fairing that, thanks to this invention, presents no particular manufacturing constraints. In this way it is also possible to produce fairings that also support headlamps of large dimensions and weight, since a suitable calibration of the elastic means allows counterbalancing the locking effect of steering that would ensue.

So, thanks to this invention, the dimensional, aesthetic and structural constraints presented today by the front axles of motor vehicles of the known solutions have been overcome. Therefore, designers can range over broad adjustments of parameters of the front axle such as the incidence of the steering tube, the weight, the size and the fastening of the fairing and its components such as for example the headlamp, the steering plates, the diameter of the wheels, the adjustments of the front suspension, the opening of the front handlebar and the like.

The use of Belleville springs allows the development of high elastic return forces even with small compression strokes.

In addition, the mechanism is not very bulky and not very visible from the outside so as not to impact the aesthetics of the front axle of the motor vehicle.

Finally the system is lightweight and inexpensive to manufacture and assemble.

A person skilled in the art, in order to satisfy contingent and specific needs, may make numerous modifications and variations to the steering groups described above, all however contained within the scope of the invention as defined by the following claims.

The invention claimed is:
1. Steering group of a motor vehicle comprising
   a front frame fitted with a steering tube rotatably housing a steering shaft or pin, which rotates around a steering axis
   the front frame being fitted with an upright integral with said steering tube,
   the front frame comprising a steering bracket, joined in rotation with the steering shaft, wherein
      the steering group further comprises elastic return means which elastically influence the steering shaft to position itself centrally with respect to the front frame, said elastic return means being placed and mechanically connected between the upright and the steering bracket in order to exert an elastic return action when the steering shaft rotates with respect to said central symmetrical position,
      wherein said elastic return means have a regressive trend elastic response, wherein the stiffness of the elastic return means decreases as the displacement of the steering shaft from said central position increases
   wherein a first attachment point of the elastic return means to the steering bracket is positioned in front of the steering axis, in a forward direction relative to a plane P orthogonal to the steering axis and parallel to a lower surface of said steering bracket, and wherein a second attachment point of the elastic return means to the upright is positioned behind the steering axis with respect to said forward direction on the plane.
2. Steering group according to claim 1, wherein said elastic return means have a zero preload, so as not to exert any elastic action around the central symmetrical position of the steering shaft.
3. Steering group according to claim 1, wherein said elastic return means are placed between the upright and the steering bracket so as to be compressed when the steering shaft rotates with respect to said central symmetrical position, wherein said elastic return means have a regressive trend elastic response, wherein the stiffness of the elastic return means decreases as the compression of said return means increases.

4. Steering group according to claim 3, wherein the elastic return means comprise a piston provided with a stem sliding with respect to a seat, the piston and the seat being each integral with one of said attachment points and wherein between, the piston and the seat at least one spring is interposed so that the interaxial spacing or distance between the attachment points is variable depending on the compression of said spring.

5. Steering group according to claim 4 wherein the spring is arranged coaxially to the stem of the piston.

6. Steering group according to claim 1, wherein said attachment points are aligned with respect to the centreline plane of the front frame, placed parallel to a straight direction, so as to have a symmetrical behaviour of the elastic return means in the steering to the left and to the right with respect to the symmetrical central position of the steering shaft.

7. Steering group according to claim 1, where said attachment points of the elastic return means comprise cylindrical joints which allow respective rotations of the elastic return means around rotation axes parallel to said steering axis.

8. Steering group according to claim 1 wherein said elastic return means comprise at least one regressive trend spring.

9. Steering group according to claim 8, wherein said at least one spring is a Belleville spring.

10. Steering group according to claim 9, wherein said Belleville springs are provided for in a number between 15 and 30 in series with each other.

11. Steering group according to claim 9, wherein said Belleville springs are the same as each other.

12. Steering group according to claim 9, wherein the Belleville springs are sized so as to have 1.8<De/Di <2.4, where De is equal to an outer diameter of the Belleville spring and Di is equal to an inner diameter of the Belleville spring.

13. Steering group according to claim 9, wherein the Belleville springs are sized so as to have 18<De/t <28, where De is equal to an outer diameter of the Belleville spring and t is equal to a thickness of the Belleville spring.

14. Steering group according to claim 9, wherein the Belleville springs are sized so as to have 0.4<h0/t'<0.75, where h0 is equal to the rest height of the Belleville spring and t is equal to a thickness of the Belleville spring.

15. Steering group according to claim 1 wherein the elastic return means comprise a plurality of regressive trend Belleville spring, positioned in series.

16. Steering group according to claim 15, wherein said Belleville springs in series are placed in direct contact with each other.

17. Motor vehicle comprising the steering group according to claim 1.

* * * * *